(12) United States Patent
Cloutier et al.

(10) Patent No.: US 8,154,598 B2
(45) Date of Patent: *Apr. 10, 2012

(54) MULTIPURPOSE UNATTENDED GROUND SENSOR NODE WITH RELAY CAPABILITY

(75) Inventors: Scott Cloutier, Fairport, NY (US); Robert Post, Victor, NY (US); Peter Roth, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1548 days.

This patent is subject to a terminal disclaimer.

(21) Appl. No.: 11/598,910

(22) Filed: Nov. 14, 2006

(65) Prior Publication Data

US 2008/0111884 A1    May 15, 2008

(51) Int. Cl.
*H04N 7/18*    (2006.01)
(52) U.S. Cl. ........................................... 348/152
(58) Field of Classification Search .................... 348/152
See application file for complete search history.

(56) References Cited

U.S. PATENT DOCUMENTS

| | | | |
|---|---|---|---|
| 6,531,965 B1 * | 3/2003 | Kaiser et al. | 340/870.01 |
| 7,020,701 B1 | 3/2006 | Gelvin et al. | |
| 2004/0217881 A1 * | 11/2004 | Pedyash et al. | 340/870.07 |
| 2006/0176169 A1 | 8/2006 | Doolin et al. | |

* cited by examiner

*Primary Examiner* — Joseph Avellino
*Assistant Examiner* — Marshall McLeod
(74) *Attorney, Agent, or Firm* — Harness, Dickey & Pierce, PLC (57) ABSTRACT

An unattended sensor is provided for use in a surveillance system. The sensor is generally comprised of: a detector; a signal processor; a radio transceiver; a power source; and a controller which configures the sensor in either a sensor mode or a relay mode. When configured in the sensor mode, the detector and signal processor are operational and the transceiver is non-operational. When configured in the relay mode, the transceiver is operational but the detector and signal processor are non-operational. In an alternative approach, the detector and the signal process may remain operational in the relay mode.

16 Claims, 7 Drawing Sheets

MULTIPURPOSE UNATTENDED GROUND SENSOR NODE WITH RELAY CAPABILITY

FIELD

The present disclosure relates to an unattended ground sensor and, more particularly, to a sensor node that can be configured as a relay to accommodate dynamic operational scenarios.

BACKGROUND

Throughout the world, military and homeland security forces face an increasing need to provide safety and security to troops and high-value assets. Wireless surveillance systems are emerging as a way of meeting this need. However, when developing a communications system for military application, a variety of obstacles need to be overcome. For example, to achieve an extended VHF communication range, existing solutions require relay devices which are separate from the sensor devices. To the extent that some of these remotely deployed devices act as both sensors and relays, these devices are not configured to operate in a manner which conserves power resources.

Therefore, it is desirable to develop an unattended sensor which may be configured to operate in either a sensor mode or a relay mode. The statements in this section merely provide background information related to the present disclosure and may not constitute prior art.

SUMMARY

An unattended sensor is provided for use in a surveillance system. The sensor is generally comprised of: a detector; a signal processor; a radio transceiver; a power source; and a controller which configures the sensor in either a sensor mode or a relay mode. When configured in the sensor mode, the detector and signal processor are operational and the transceiver is non-operational. When configured in the relay mode, the transceiver is operational but the detector and signal processor are non-operational. In an alternative approach, the detector and signal processor may remain operation when in relay mode.

Further areas of applicability will become apparent from the description provided herein. It should be understood that the description and specific examples are intended for purposes of illustration only and are not intended to limit the scope of the present disclosure.

The drawings described herein are for illustration purposes only and are not intended to limit the scope of the present disclosure in any way.

DETAILED DESCRIPTION

Figure 1:
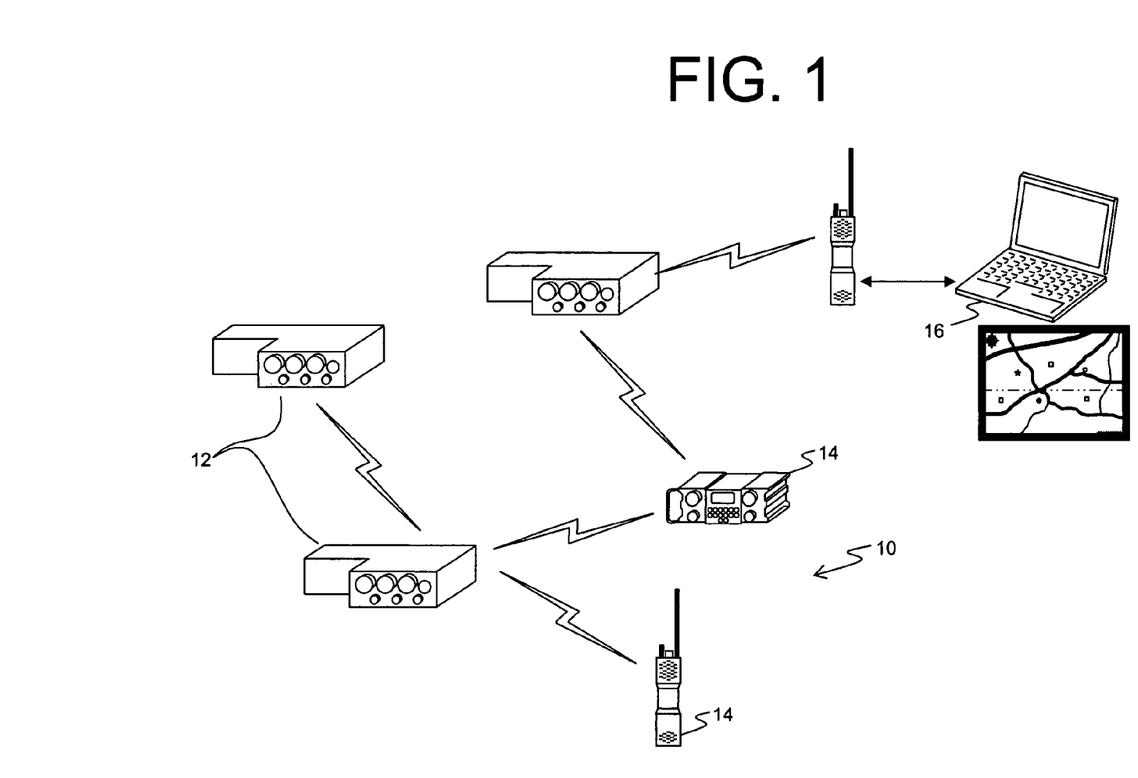
FIG. 1 is a diagram of an exemplary surveillance system.

FIG. 1 depicts an exemplary surveillance system. The surveillance system is comprised of a plurality of unattended sensors 12 and one or more monitoring devices 14. Sensors 12 are configured to gather surveillance data and broadcast the data across a wide area wireless network in a manner further described below. Surveillance data may be intended for a dedicated command node 16 and/or may be intercepted by various monitoring devices 14 residing in the network. It is understood that the sensor nodes may also serve as relays between other devices in the network.

Figure 2:
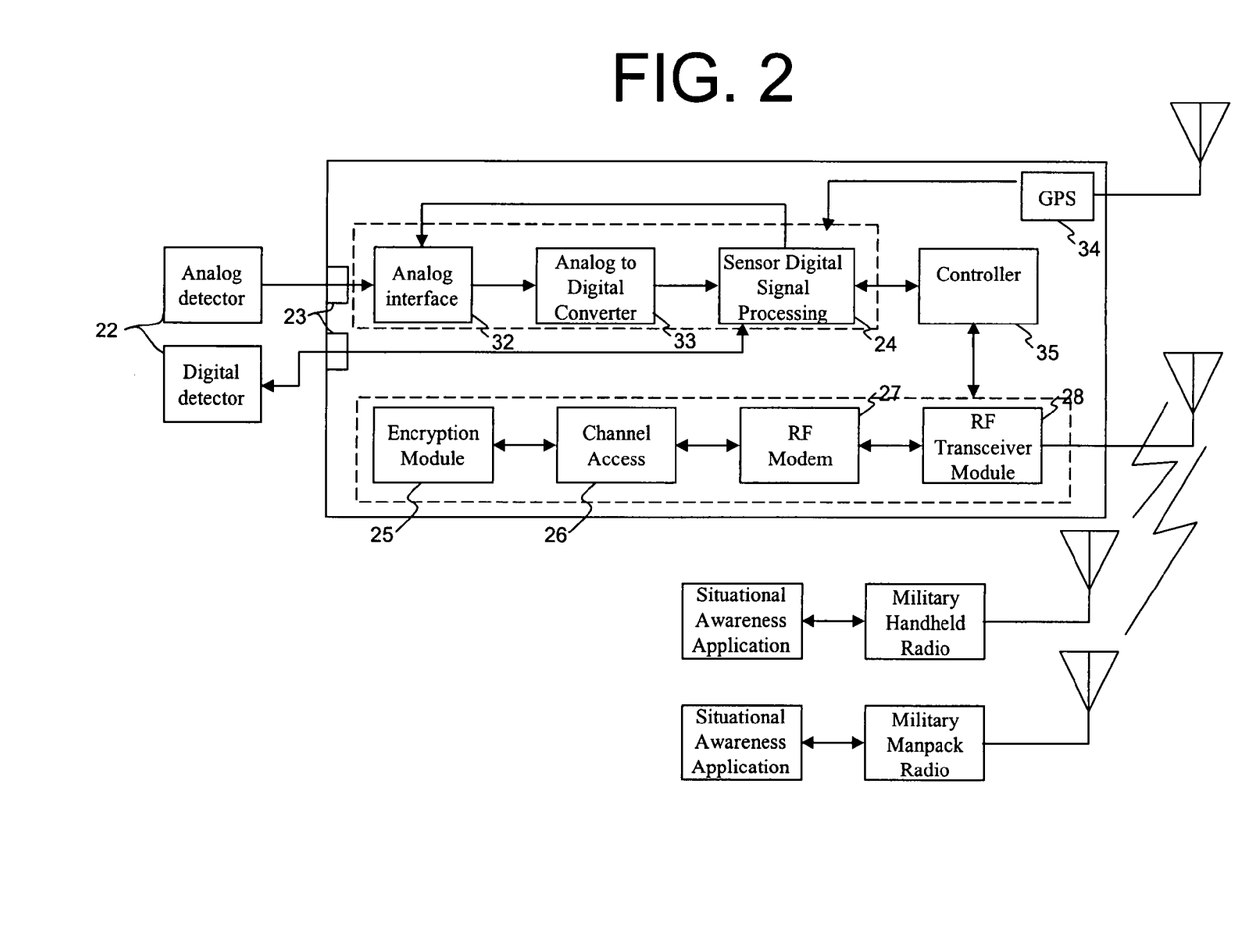
FIG. 2 is block diagram of an exemplary configuration for an unattended sensor in the surveillance system.

FIG. 2 provides an exemplary configuration for an unattended sensor 12. The sensor 12 is comprised generally of one or more detectors 22, a signal processor 24, a channel access mechanism 26, and a radio frequency (RF) transceiver 28. Each of these components, along with other preferred components, is further described below. It is to be understood that only the relevant components are discussed below, but that other known components (e.g., power source) are needed to control and manage the overall operation of the sensor. Within the broader aspects of the disclosure, it is also envisioned that these components may be arranged in different configurations.

A detector 22 is a device that generates an electric signal in response to a physical stimulus proximate to the detector. The detector 22 may be an analog device, such as a magnetic detector, a passive infrared detector or a seismic detector, or a digital device, such as an acoustic detector or a digital imager. A magnetic detector detects magnetic field changes caused by ferrous material such as weapons or vehicles moving through an area. A passive infra-red detector detects incident infrared changes caused by a thermal mass such as personnel or vehicles moving through an area. A seismic detector detects vibrations that are analyzed to determine the type of intrusion. It is to be understood that other type of detectors are intended to fall within the scope of this disclosure. Although one or more detectors may be integrated into the sensor, it is preferable that the sensor is configured with at least two interfaces 23 for coupling different detectors. In this way, a sensor can be configured with different types of detectors depending on the surveillance requirements. Upon deployment of the sensor, a detector may be electrically connected via the interface to the sensor.

Electrical signals from detectors are processed by the digital signal processor 24. The digital signal processor 24 is operable to assess the signals and determine if there is an alarm or event which merits reporting. If so, the digital signal processor 24 formulates a message which is to be sent over the network. For example, in the case of a passive infrared detector, a temperature value is reported to the digital signal processor. An exemplary algorithm for an infrared detector may evaluate how the temperature varies over time. A temperature baseline is determined by averaging the temperature of the recent past. Subsequent temperature values are compared to the baseline value. When a temperature value falls outside the standard deviation of the baseline value, an alarm may be triggered. Alternatively, the temperature value may be further evaluated to determine if an event message is merited. For instance, the temperature value must exceed some absolute temperature threshold before an alarm is triggered. It is understood that the baseline value is adjusted over time to account for changes in the ambient temperature. Moreover, it is understood that other types of algorithms may be employed for an infrared detector and that different types of detectors will employ different types of algorithms. In the case of a digital detector, it is envisioned that the detection algorithm may be embedded in the detector.

In the case of an analog detector, analog signals from the detector 22 must be converted to a digital signal prior to being input to the digital signal processor 24. Thus, the sensor further includes an analog-to-digital converter 33 interposed between the detector 22 and the digital signal processor 24. In addition, an analog interface 32 may precede the a/d converter 33. The analog interface 32 is configured to receive analog signals from a detector 22 and operable to filter or otherwise condition the signals. It is readily understood that suitable signal conditioning will depend on the type of signal being received. Moreover, it is envisioned that the signal conditioning may be adjusted using a feedback from the signal processor depending on the type of detector.

A global positioning system (GPS) module 34 may be embedded in the sensor. The GPS module 34 is adapted to receive a timestamp as well as positional information in a manner well known in the art. The digital signal processor 24 in data communication with the GPS module 34 may opt to tag outgoing event messages with a timestamp of when the alarm occurred and/or positional information for the sensor. Other means for determining the current time or capturing positional information for the sensor are also contemplated by this disclosure.

In an exemplary embodiment, a packet converter (not shown) is adapted to receive data from the digital signal processor 24. The packet converter in turn encapsulates the data received from the signal processor into one or more data packets. The data packets are defined in accordance with the Internet protocol or some other transport protocol. In this way, the event messages may be sent to and received by other IP compatible devices residing in the network. It is understood that event messages need not be sent in packet form.

The sensor further includes an RF modem 27 and an RF transceiver module 28. Messages may be sent and received by the sensor using these components. In a preferred embodiment, the wireless radio link employed by the sensor is designed to be compatible with existing military radio technology. In other words, each of these components is preferably of military grade. For example, the RF modem 27 may implement a frequency hopping scheme; whereas, the RF transceiver module 28 is a VHF network module that operates in the frequency range from 30 MHz to 108 MHz. Exemplary RF modems and RF transceiver modules can be found in various military grade radios such as the RF-5800 handheld radio and RF-5800 manpack radios commercially available from Harris Corporation. In this way, the sensor is able to communicate with handheld radios as well as other communication devices deployed within the network in a manner further described below. This provides reduced logistics in parts and training. In addition, it minimizes the lifecycle cost of a system if the user already owns a piece of the system or has multiple users.

To reduce channel contention, the sensor also employs a channel access mechanism 26. Channel access is the scheme by which a radio node negotiates access and is granted permission to utilize a shared communication medium. In an exemplary embodiment, the sensor node uses the Multiple Access with Collision Avoidance (MACA) protocol or variants thereof. It is envisioned that other channel access protocols may be employed within the broader aspects of this disclosure. However, this protocol is particularly suited for mobile communication devices which use tactical line of sight VHF channels.

A fundamental architectural decision that must be made when designing a channel access protocol for military applications is where the protocol is implemented with respect to the encryption device. Traditionally, the interface to the encryption device is a baseband audio or serial data and therefore the encryption device is interposed between the channel access protocol and the radio modem. With reference to FIG. 2, the encryption device 25 is preferably interposed between the signal processor 24 and the channel access mechanism 26. The encryption device 25 is operable to encrypt and decrypt messages. Although various algorithms are contemplated, the encryption module 25 preferably employs a Citadel encryption algorithm. In this arrangement, the encryption device can have detailed and immediate information about channel conditions, even to the sub-symbol level.

Lastly, the sensor node includes a controller 35. The controller 35 is in data communication with each of the other components discussed above and is responsible for the overall operation of the node. For example, the controller 35 configures the operating mode of the sensor in the manner further described below.

Figure 3:
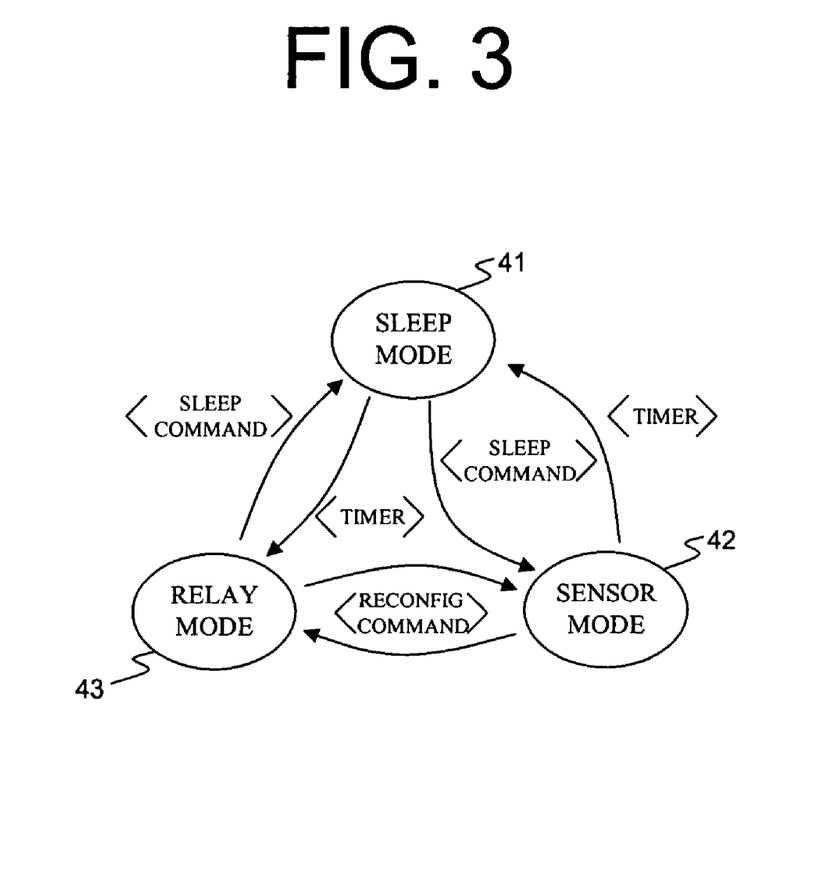
FIG. 3 is a state diagram illustrating exemplary operating modes for a sensor node.

With reference to FIG. 3, the sensor node is preferably set to one of the two operating modes: sensor mode or relay mode. The sensor node may be equipped with a switch or a suitable user interface which enables a person to set the operating mode upon deployment. Alternatively, the sensor node may provide an external interface (e.g., USB port) which enables a portable computing device to interface with the controller of the sensor node. In this case, the portable computing device provides a suitable command to set the operating mode and the controller of the sensor node configures the operating mode in accordance with the command.

In sensor mode, the detectors and components needed to support the detectors are operational. For example, the detectors, the analog interface, the analog-to-digital converter, and the signal processor are operational in the exemplary embodiment described above. On the contrary, the radio components are non-operational. It is readily understood that not all of these components need to be operational depending upon the type of detectors.

The controller sets the operational state of the various components. Components which are operational are understood to be drawing power from a power supply of the sensor node. In an exemplary embodiment, a switch (e.g., a field effect transistor) is disposed between the powers source and one or more of the components. It is understood that a single switch may be interposed between the power source and the radio components or multiple switches may be used such that a different switch is interposed between the power source and each different component. Each switch is in turn controlled by the controller. By connecting the gate of a transistor to an output pin of the controller, the controller can control the on/off state of the switch and thus the operational state of a given component. The controller may also need to configure other parameters associated with a given component for it to be operational. Other techniques for controlling the operational state of a given component are also contemplated by this disclosure.

In the relay mode, the radio components are operational while the detector components are non-operational. For example, the encryption module, the channel access mechanism, the modem and the transceiver may be operational. Alternatively, the sensor node may employ a low power relay mode, whereby only the transceiver is operational. Upon receipt of a wake up message, the remaining radio components are powered up, thereby conserving power until such time these components are needed. In an alternative embodiment, the detector and signal processor remain operational when the node is configured in relay mode. It is also envisioned that the sensor node may be employ another mode in which all of the components are operational.

In addition, the sensor node may provide a sleep mode as shown in FIG. 3. Upon deployment, neither the sensor mode nor the relay mode may be needed for a period of time. Thus, only the controller is operational. During sleep mode, the controller maintains an internal clock. After a predetermined amount of time, the controller is programmed to configure the sensor node in either sensor mode or relay mode. Upon deployment, the GPS module may be powered on briefly to determine the current time which is in turn used by the controller to maintain an internal clock. It is envisioned that the sensor node may be commanded to return to a sleep mode.

During sensor mode, the signal processor is evaluating signals received from the detectors. The signals may correlate to an event which merits further reporting. In some instances, the event is merely logged in a local data store for subsequent analysis. In other instances, the event is immediately transmitted over the wireless radio link to other communication devices in the network. These communication devices may be the intended destination for an event message or may operate as a relay node to relay the message to other nodes in the network.

Figure 4:
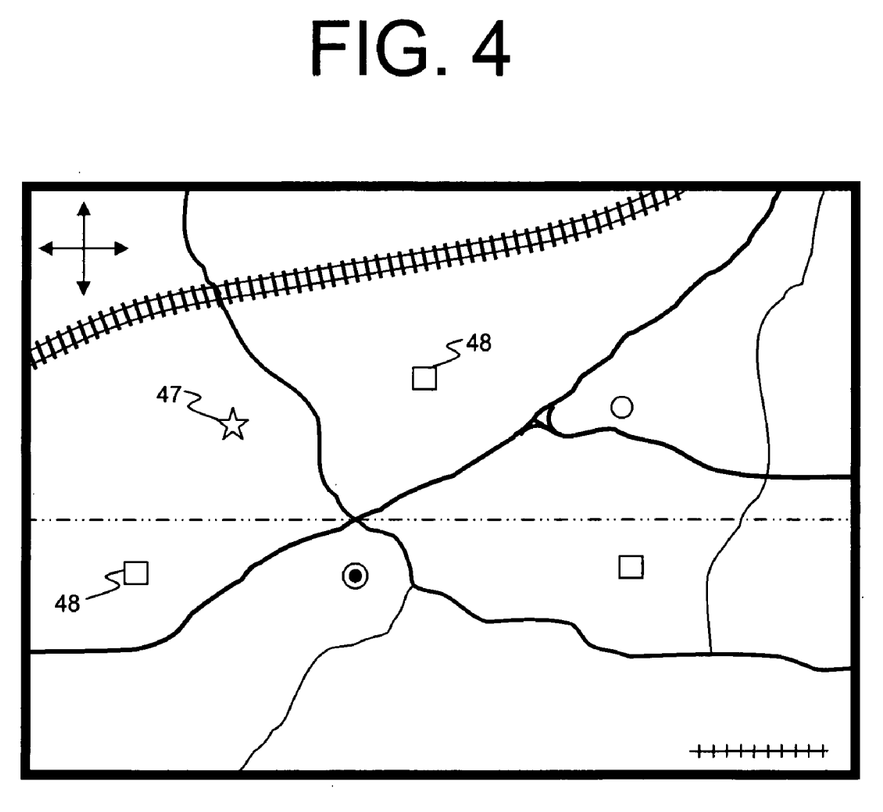
FIG. 4 is a diagram of an exemplary map which may be displayed by a sensor management application.

At least one of the communication devices is likely to be designated as a command node. In an exemplary embodiment, the command node may be configured with a situational awareness software application. The situational awareness application is configured to display surveillance data in real-time and preferably in a geographical context (e.g., on a map) as shown in FIG. 4. For instance, a sensor alarm and/or each sensor node may be displayed as a unique icon as indicated at 48 on a map. Likewise, the command node may be displayed as an icon as indicated at 47. The command node also logs events in a data store for subsequent assessment.

Figure 5:
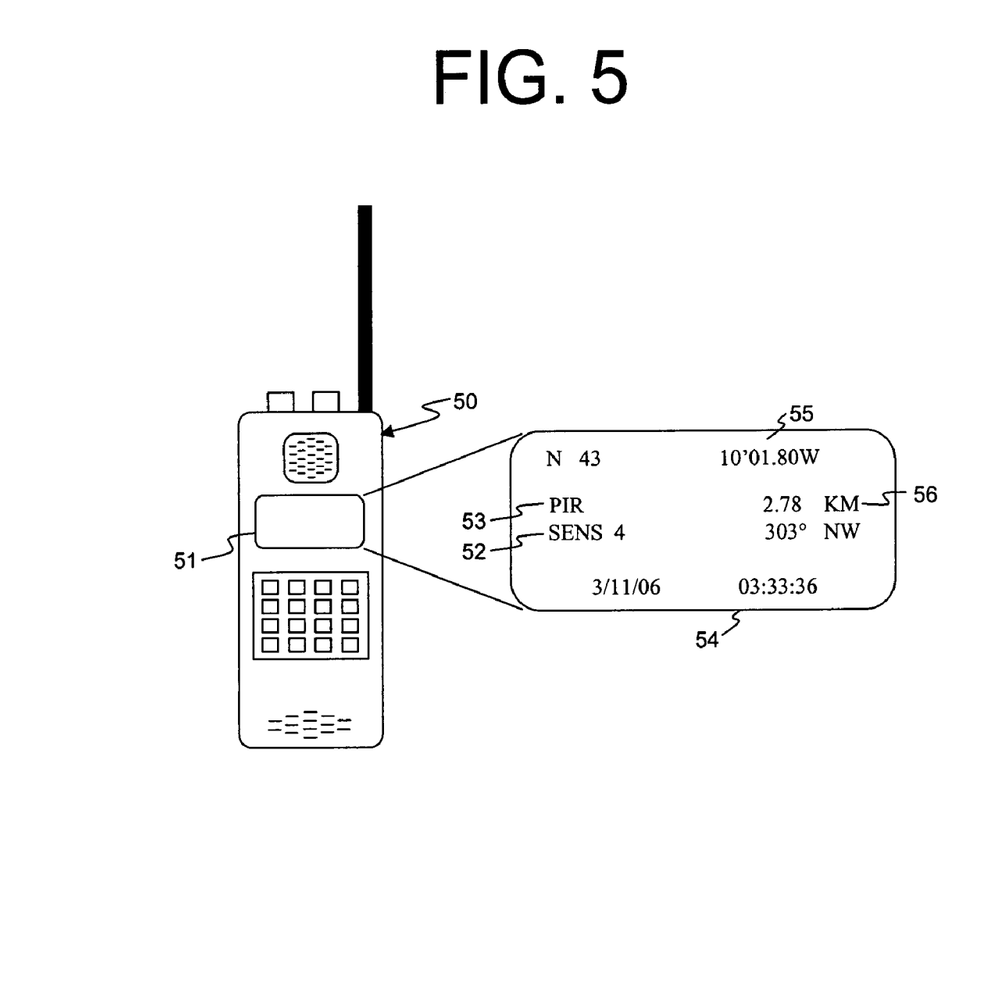
FIG. 5 is a diagram of an exemplary handheld radio displaying indicia of an event message received from a sensor.

In an exemplary embodiment, the monitoring device may be a handheld radio device. The radio device is equipped with a transceiver for sending and receiving voice data over the network and a channel access mechanism that negotiates access to the radio link in accordance with the same channel access protocol employed by the sensor node. In this way, the radio device is able to receive event messages from sensor nodes residing in the network.

In addition, the radio device is equipped with a signal processor adapted to receive the event messages and provide indicia of the event to the radio operator. For instance, the radio device may be operable to generate an audible indicator in response to receiving an event message from a sensor node. With reference to FIG. 5, the radio device 50 may be equipped with a display device 51. In these instances, the radio device 50 may generate indicia of the event on a display. The indicia may include an identifier for the sensor node 52, an identifier as the type of detector 53 which originated the event, the time the event occurred 54 and/or location information 55 for the sensor. If the radio device is also equipped with a GPS module, the display may further include the position of the sensor node 56 in relation to the radio. Radios equipped with a larger display and more computing power (e.g., a manpack radio device) may be configured with the situational awareness application described above. Alternatively, a portable computing device, such as a laptop computer, configured with the situational awareness application may be interfaced with a radio device to receive event and display event messages from a sensor node.

Once deployed, it is preferable that the operating mode of the sensor node be remotely re-configurable. Therefore, the sensor node is adapted to receive device configuration messages over its wireless radio link and operable to re-configure itself in accordance with the messages. When the sensor node is configured in relay mode, it is able to receive configuration messages. These messages can be passed along to the controller which can in turn change the operating mode of the node in the manner described above.

Figure 6:
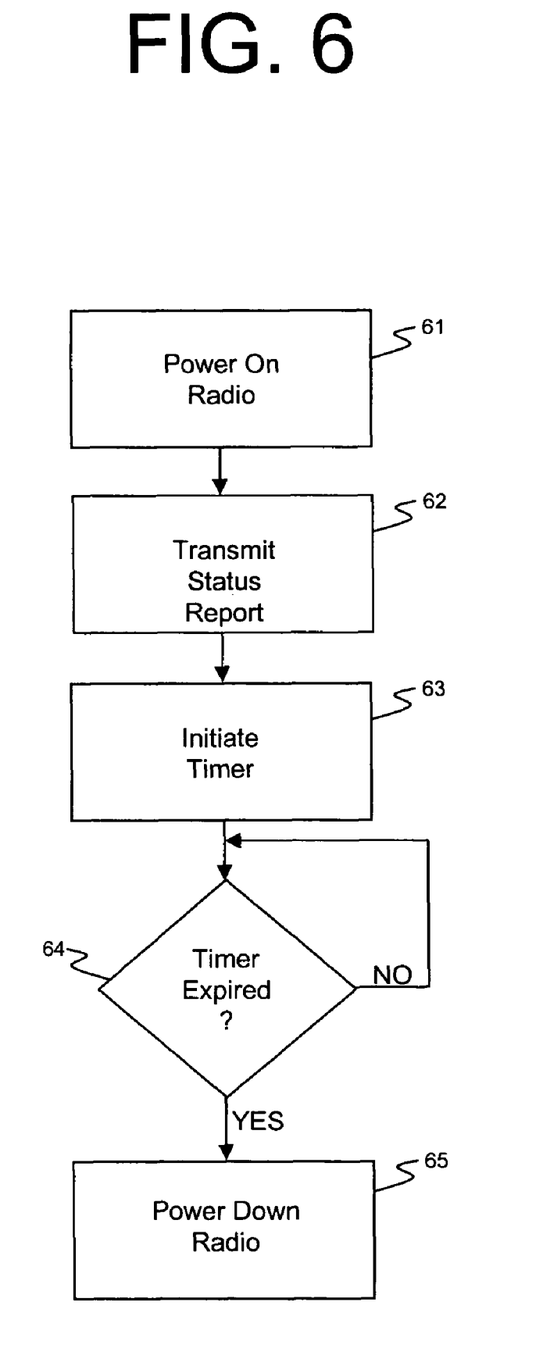
FIG. 6 is a flowchart for an exemplary procedure periodically executed by a sensor node operating in sensor mode.

When the sensor node is configured in sensor mode, the radio components are not operational and thus the node is unable to receive configuration messages. To address this scenario, the sensor node is further configured to periodically power on the radio components when in sensor mode. FIG. 6 illustrates an exemplary procedure periodically executed when in sensor mode. First, the controller powers on the radio components as indicated at 61. While the radio components are operational, the controller operates to broadcast a status report 62 for the node over the network. A timer is initiated at 63. Thus, the radio components remain operational for a short period of time to allow receipt of incoming messages in response to the status report message. During this time, the sensor node may receive a device configuration message requesting the node to function in relay mode. In this way, the sensor node may be remotely re-configured from sensor mode to relay mode. If no such messages are received by the node during this time, then the radio components are powered down at 65 by the controller.

Figure 7:
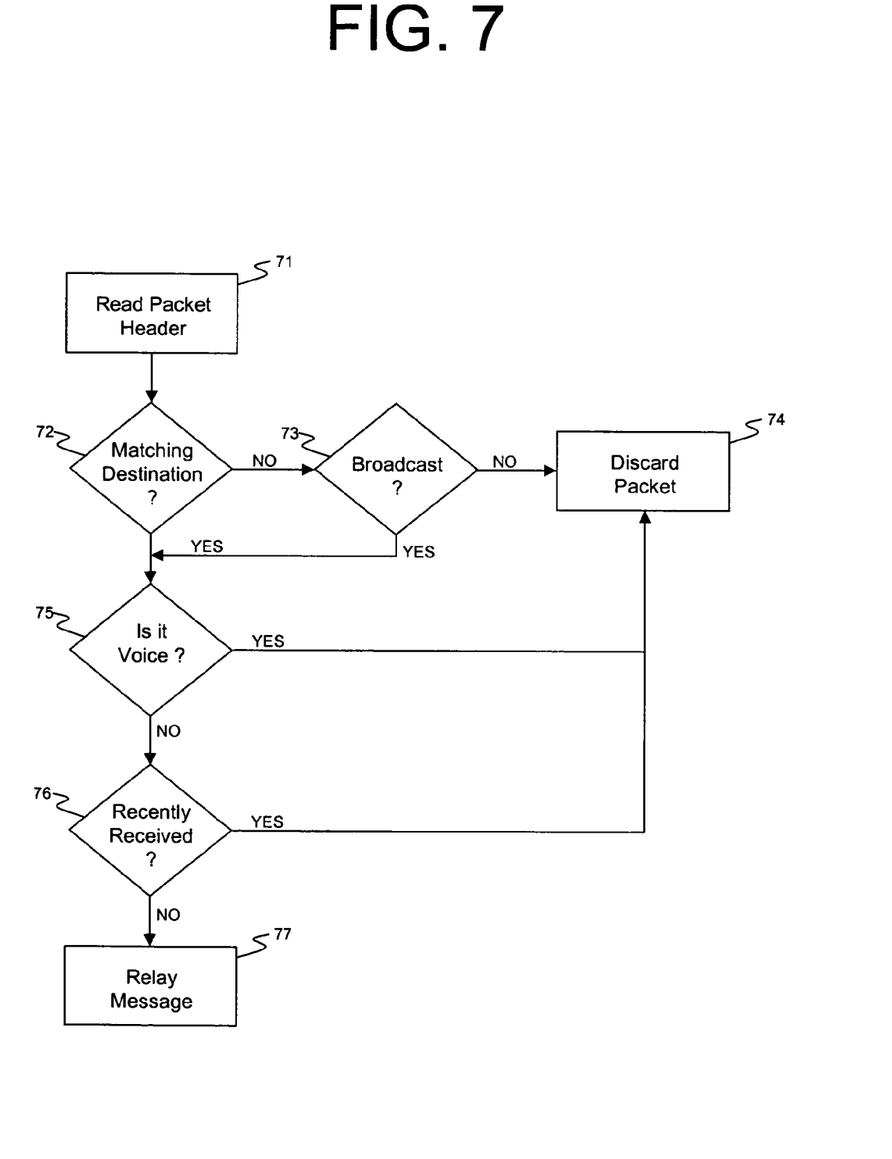
FIG. 7 is a flowchart for an exemplary method for handling incoming messages at a sensor node operating in relay mode.

FIG. 7 illustrates an exemplary method for handling incoming messages at a sensor node operating in relay mode. First, the intended destination is checked at 72 for each message incoming to the sensor node. In the exemplary embodiment, messages are sent as data packets in accordance with the IP protocol and thus a unique IP address identifies each network device. The source and destination of the packet is identified in the packet header. When the intended destination for a packet corresponds to the recipient node, the packet is passed along for further processing.

Data packets may also be broadcast over the network. When the intended destination does not correspond, then the data packet is checked at 73 to determine if it is a broadcast message. Likewise, a broadcast message is passed along for further processing. When a data packet is neither intended for the recipient nor a broadcast message, then the packet is discarded at 74 by the sensor node.

The packet header may further include an identifier for the type of data contained therein. Since the sensor node is interoperable with radios in the network, the sensor node may receive data packets that contain voice data. Therefore, the type of data a packet contains is checked at 75. When the packet contains voice data, it is also discarded at 74 by the sensor node; otherwise the packet is passed along for further processing.

Depending upon on the network configuration, it is also envisioned that the sensor node may receive the same data packet from multiple relay nodes. To avoid unnecessarily relaying the same packet more than once, the sensor node may create a log of recently received messages. In an exemplary embodiment, a unique source identified (e.g., IP address) and a unique sequence number is assigned to each transmitted data packet. Upon receipt of a packet, the sensor node checks the log at 76 to see if the message has been recently received. If so, then the message is discarded by the sensor node. If not, then the identifying information for the message is recorded in the log. In a variation, a checksum value (e.g., a cyclic redundancy check) may also be checked before the message is discarded. Finally, the incoming message is scheduled at 77 to be re-transmitted over the network by the sensor node. In this way, a sensor node operating in relay mode effectively serves as a relay in the network.

Device reconfiguration requests are typically sent from a command node. Although the command node may be situated only a single hop from the sensor node, it is also envisioned that a reconfiguration request may travel over multiple hops before reaching the intended sensor node. In this case, the reconfiguration request may not reach the intended sensor node prior to radio components being powered down. Accordingly, the sensor nodes have been further configured to establish a communication link between a command node and a remote sensor node.

First, the command node is configured to learn the network topology. In one exemplary embodiment, the command node learns of the location of each sensor node from the periodic status reports sent by each node to the command node. When the command node desires to reconfigure a node operating in sensor mode, it may send a message to relay node adjacent (i.e., within a single hop) to the intended node. The relay node will in turn store the message from the command node until it receives an incoming message from the intended node.

Upon receipt of incoming messages, a relay node will check to see if the messages are from the intended node. If a message is received at the relay node from the intended node, then the message from the command node is immediately transmitted by the relay node to the intended node. In this way, the message is received by the intended node before its radio components are powered down. Moreover, the intended node can implement the reconfiguration request from the command node. While the above description has referred to a request to reconfigure the operating mode, it is readily understood that this methodology is applicable to other types of messages which are intended for a node operating in sensor mode. Therefore, if necessary, the If necessary, the intended node can exchange additional messages with the command node before returning the radio components to a non-operational state.

The following description is merely exemplary in nature and is not intended to limit the present disclosure, application, or uses.

What is claimed is:

1. An unattended sensor with relay capability, comprising:
   a detector that generates an electrical signal in response to a physical stimulus proximate to the sensor;
   a signal processor adapted to receive the electrical signal from the detector and operable to generate event messages based on the electrical signal;
   a transceiver operable to send and receive messages over a wireless radio link;
   a channel access mechanism operable to negotiate access to the radio link in accordance with an access protocol;
   an encryption module interposed between the signal processor and the channel access mechanism and operable to encrypt and decrypt messages sent over the radio link;
   a power source operably coupled to the detector, the signal processor and the transceiver; and
   a controller in data communication with the detector, the signal processor and the transceiver and operable to configure the sensor in either a sensor mode or a relay mode, wherein the detector and signal processor are operational and the transceiver is conditionally operational when configured in the sensor mode, and the transceiver is operational and the detector and signal processor are non-operational when configured in the relay mode.

2. The unattended sensor of claim 1 wherein the controller periodically powers up the transceiver when in sensor mode and cooperatively operates with the transceiver to send a status message over the wireless radio link.

3. The unattended sensor of claim 1 wherein the controller is adapted to receive a command indicative of a desired configuration mode and operable to configure the sensor in accordance with the command.

4. The unattended sensor of claim 1 further comprises a global positioning system in a data communication with the signal processor, such that event messages are tagged with positional data for the sensor.

5. The unattended sensor of claim 1 further comprises
   a modem operable to transmit and receive messages over the radio link in accordance with a frequency hopping scheme, wherein the encryption module, the channel access mechanism and the modem are non-operational when the sensor is configured in sensor mode.

6. The unattended sensor of claim 5 wherein the encryption module, the channel access mechanism and the modem are non-operational in sensor mode until a wake-up message is received by the sensor and the controller configures the encryption module, the channel access mechanism and the modem to be operational upon receipt of a wake-up message.

7. The unattended sensor of claim 1 further comprises a data store in data communication with the controller, wherein the controller is adapted to receive messages over the radio link intended for another sensor and operable to store the messages in the data store when the another sensor is configured in sensor mode.

8. The unattended sensor of claim 1 wherein the controller cooperatively operates with the transceiver to send the stored messages to the another sensor upon receipt of a message from the another sensor.

9. The unattended sensor of claim 1 wherein the detector is further defined as at least one of a seismic detector, a magnetic detector, a passive infra-red detector, an acoustic detector or a digital imager.

10. An unattended sensor with relay capability, comprising:
    a detector that generates an electrical signal in response to a physical stimulus proximate to the sensor;
    a signal processor adapted to receive the electrical signal from the detector and operable to generate event messages based on the electrical signal;
    a transceiver operable to send and receive messages over a wireless radio link;
    a power source operably coupled to the detector, the signal processor and the transceiver; and
    a controller in data communication with the detector, the signal processor and the transceiver and operable to configure the sensor in either a sensor mode or a relay mode, wherein the detector and signal processor are operational and the transceiver is non-operational when configured in the sensor mode, but the controller periodically powers up the transceiver when in sensor mode and cooperatively operates with the transceiver to send messages over the wireless radio link.

11. The unattended sensor of claim 10 wherein the transceiver is operational and the detector and signal processor are non-operational when configured in the relay mode.

12. The unattended sensor of claim 11 wherein the transceiver, the detector and the signal processor are operational when configured in the relay mode.

13. A surveillance system comprising:
    a first unattended sensor having a transceiver and configured in a sensor mode; and
    a second unattended sensor having a detector that generates an electrical signal in response to a physical stimulus proximate to the sensor;

a signal processor adapted to receive the electrical signal from the detector and operable to generate event messages based on the electrical signal;

a transceiver operable to send and receive messages over a wireless radio link; and a controller operable to store incoming messages intended for the first sensor and transmit the incoming messages to the first sensor upon receipt of a message from the first sensor.

14. The surveillance system of claim 13 wherein the first sensor is operable to communicate over the wireless radio link with the second sensor.

15. The surveillance system of claim 13 wherein the first sensor further includes a detector that generates an electrical signal in response to a physical stimulus proximate to the sensor;

a signal processor adapted to receive the electrical signal from the detector and operable to generate event messages based on the electrical signal;

a power source operably coupled to the detector, the signal processor and the transceiver; and a controller in data communication with the detector, the signal processor and the transceiver and operable to configure the sensor in a sensor mode or a relay mode, wherein the detector and signal processor are operational and the transceiver is non-operational when configured in the sensor mode, and the transceiver is operational and the detector and signal processor are non-operational when configured in the relay mode.

16. The surveillance system of claim 13 wherein the controller periodically powers up the transceiver when in sensor mode and cooperatively operates with the transceiver to send a status message over the wireless radio link.

* * * * *